United States Patent
Haran et al.

(10) Patent No.: US 10,025,403 B2
(45) Date of Patent: Jul. 17, 2018

(54) STYLUS COMMUNICATION CHANNELS

(71) Applicant: Microsoft Technology Licensing, LLC, Redmond, WA (US)

(72) Inventors: On Haran, Kfar Saba (IL); Eliyahu Barel, Beit Ariye (IL)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 15/219,058

(22) Filed: Jul. 25, 2016

(65) Prior Publication Data

US 2018/0024651 A1    Jan. 25, 2018

(51) Int. Cl.
*G06F 3/00* (2006.01)
*G06F 3/038* (2013.01)
*G06F 3/0354* (2013.01)
*G06F 3/0488* (2013.01)

(52) U.S. Cl.
CPC ........ *G06F 3/0383* (2013.01); *G06F 3/03545* (2013.01); *G06F 3/04883* (2013.01)

(58) Field of Classification Search
CPC . G06F 3/04883; G06F 3/0383; G06F 3/03545
See application file for complete search history.

(56) References Cited

U.S. PATENT DOCUMENTS

| | | | |
|---|---|---|---|
| 5,294,792 | A | 3/1994 | Lewis et al. |
| 8,766,954 | B2 | 7/2014 | Vuppu et al. |
| 9,035,919 | B2 | 5/2015 | Cooke |
| 9,176,630 | B2 | 11/2015 | Westhues et al. |
| 9,213,423 | B2 | 12/2015 | Bell |
| 2009/0078473 | A1 | 3/2009 | Overgard et al. |
| 2011/0122087 | A1 | 5/2011 | Jang et al. |

(Continued)

FOREIGN PATENT DOCUMENTS

WO    2016004003 A1    1/2016

OTHER PUBLICATIONS

Sumocat, "N-Trig announces Digital Pencil for DuoSense touch-screens", Published on: May 24, 2010 Available at: http://www.gottabemobile.com/2010/05/24/n-trig-announces-digital-pencil-for-duosense-touchscreens/.

(Continued)

*Primary Examiner* — Muhammad N Edun
(74) *Attorney, Agent, or Firm* — Rainier Patents, P.S.

(57) ABSTRACT

Stylus communication channels are described. In implementations, a stylus includes multiple separate and distinct communication channels used to detect the stylus, resolve positions of the stylus and a user relative to a computing device, and exchange data with the computing device (e.g., transmit and receive communications). The stylus may include a first electrode arranged in a tip portion is and a second electrode arranged in a grip area configured to form different corresponding communication channels with the computing device through the tip and through the grip area and a user's hand/body, respectively. A processing system of the computing device, such as a CPU or microcontroller, implements a stylus control module configured to analyze signal patterns derived from signals communicated the first electrode and second electrode and detect the stylus and/or resolve positions of the stylus and a user relative to the computing device based on the analysis.

20 Claims, 8 Drawing Sheets

(56) References Cited

U.S. PATENT DOCUMENTS

| | | |
|---|---|---|
| 2012/0062497 A1 | 3/2012 | Rebeschi et al. |
| 2013/0106777 A1 | 5/2013 | Yilmaz et al. |
| 2013/0207925 A1 | 8/2013 | Ryshtun et al. |
| 2014/0043279 A1 | 2/2014 | Pedersen et al. |
| 2014/0092054 A1 | 4/2014 | Ng |
| 2014/0192030 A1 | 7/2014 | Ryshtun et al. |
| 2014/0267180 A1* | 9/2014 | Buelow ............... G06F 3/03545 345/179 |
| 2016/0048227 A1 | 2/2016 | Brunet et al. |
| 2017/0068344 A1* | 3/2017 | Bhandari ............ G06F 3/03545 |
| 2017/0192537 A1* | 7/2017 | Timothy ............. G06F 3/03545 |

OTHER PUBLICATIONS

"International Search Report and Written Opinion Issued in PCT Application No. PCT/US2017/042689", dated Sep. 4, 2017, 9 Pages.

\* cited by examiner

STYLUS COMMUNICATION CHANNELS

BACKGROUND

Functionality that is available from various kinds of computing devices (e.g., mobile devices, game consoles, televisions, set-top boxes, personal computers, etc.) is ever increasing. Additionally, the techniques that may be employed to interact with the computing devices are also developing and adapting. For example, users traditionally interacted with computing devices using keyboards and a mouse. The keyboard was typically used to enter text whereas the mouse was used to control a cursor to navigate through a user interface of the computing device as well as initiate to actions, e.g., launching applications and so on. Additional techniques were subsequently developed, such as through support of a stylus to input digital handwriting, navigate through user interfaces, and so on.

Traditionally, data exchange between a computing device and stylus occurs through a communication channel formed via a tip of a stylus. This scheme may require the tip to be touching or very near to the device display to operate. Moreover, the tip size limits the available signal transportation and communication bandwidth. Additionally, palm placement while using a stylus can interfere with data exchange and resolution of the tip position. Thus, additional time and resources may be expended and some inaccuracy may occur using styluses that rely solely upon tip based transmission for communications.

SUMMARY

Stylus communication channels are described. In implementations, a stylus is configured to include multiple separate and distinct communication channels that may be used to detect the stylus, resolve positions of the stylus and a user relative to a computing device, and exchange data with the computing device (e.g., transmit and receive communications). In implementations, an electronic stylus for a computing device includes a housing portion and a tip portion shaped to form the electronic stylus. A first electrode arranged in the tip portion is configured to form a first communication channel with the computing device through the tip portion. A second electrode arranged in a grip area of the housing portion is configured to form a second communication channel with the computing device through the grip area and through a body of a user when the user is in contact with the grip area. A processing system, such as a CPU or dedicated microcontroller implements a stylus control module configured to recognize the electronic stylus and resolve positions of the tip portion and body of the user relative to the computing device based on analysis of signal patterns derived from signals communicated by electronic stylus via the first electrode and second electrode.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different instances in the description and the figures may indicate similar or identical items.

DETAILED DESCRIPTION

Overview

Figure 1:
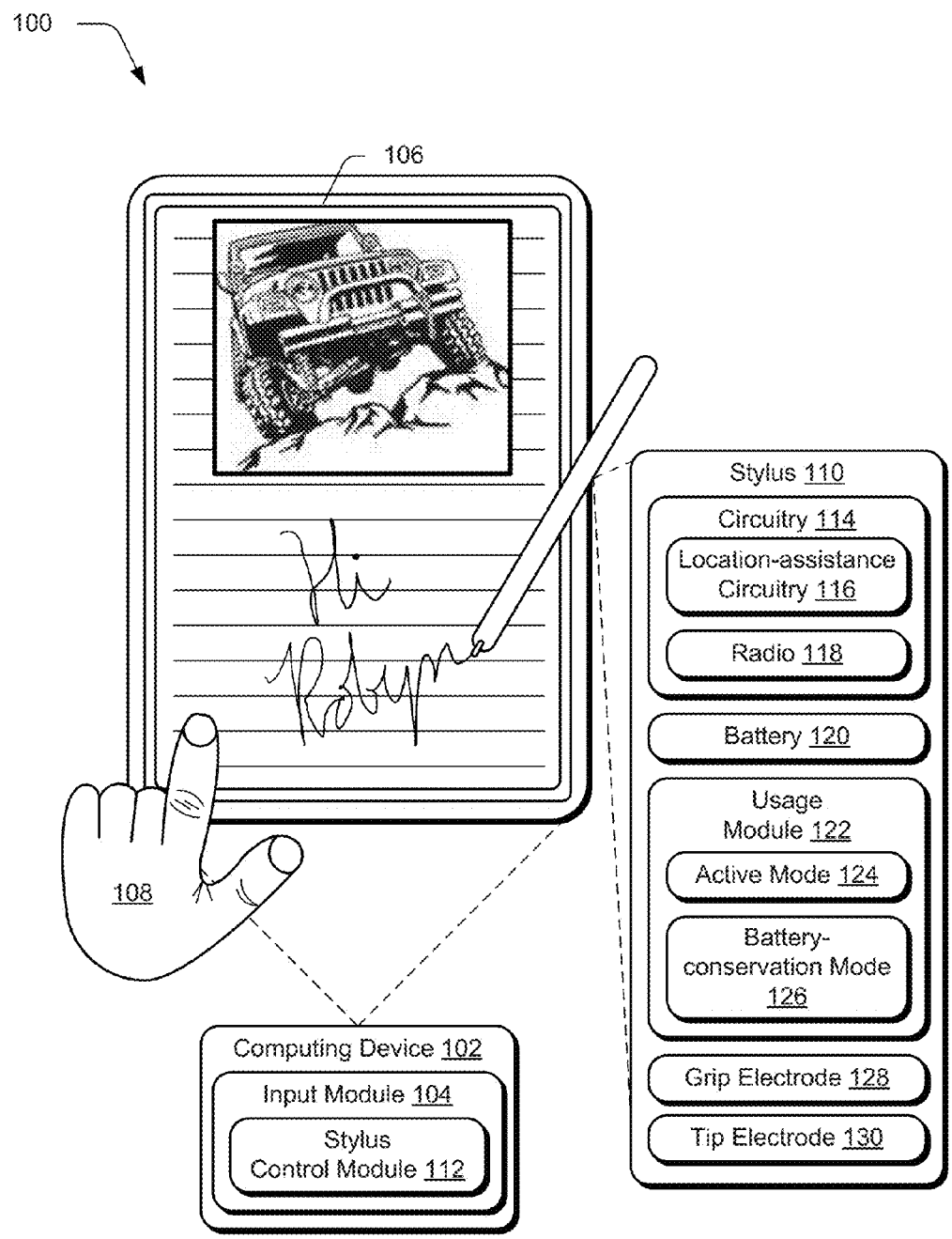
FIG. 1 is an illustration of an environment in an example implementation that is operable to employ techniques described herein.

Traditionally, data exchange between a computing device and stylus occurs through a communication channel formed via a tip of a stylus. This scheme may require the tip to be touching or very near to the device display to operate. Moreover, the tip size limits the available signal transportation and communication bandwidth. Additionally, palm placement while using a stylus can interfere with data exchange and resolution of the tip position. Thus, additional time and resources may be expended and some inaccuracy may occur using styluses that rely upon tip based transmission for communications.

Stylus communication channels are described. In implementations, a stylus includes multiple separate and distinct communication channels used to detect the stylus, resolve positions of the stylus and a user relative to a computing device, and exchange data with the computing device (e.g., transmit and receive communications). The stylus may include a first electrode arranged in a tip portion and a second electrode arranged in a grip area configured to form different corresponding communication channels with the computing device through the tip and through the grip area and a user's hand/body, respectively. A processing system of the computing device, such as a CPU or microcontroller, implements a stylus control module configured to analyze signal patterns (e.g., signatures) derived from signals communicated the first electrode and second electrode and detect the stylus and/or resolve positions of the stylus and a user relative to the computing device based on the analysis.

Employing one or more stylus communication channels in accordance with techniques described herein enables more robust and effective communications between a stylus and a host device. A communication channel established through the grip area may be associated with additional and/or greater bandwidth and data communication capabilities as the region of a user's hand/palm/body used to establish the channel is relatively large in comparison to the region of the tip used in traditional approaches. Moreover, using and interpreting signals from multiple electrodes in combination can improve accuracy and sensitivity of stylus operation. The combined signals enable the system to infer information that may be difficult to determine using just a single tip electrode, such as hand position relative to the digitizer, lifting of the hand, hand hovering, lifting of the tip while still resting the hand/palm, and so forth.

In the following discussion, an example environment is first described that is operable to employ the techniques described herein. Example illustrations of the techniques and procedures are then described, which may be employed in the example environment as well as in other environments. Accordingly, the example environment is not limited to performing the example techniques and procedures. Likewise, the example techniques and procedures are not limited to implementation in the example environment.

Example Environment

FIG. 1 is an illustration of an environment 100 in an example implementation that is operable to employ stylus techniques. The illustrated environment 100 includes an example of a computing device 102 that may be configured in a variety of ways. For example, the computing device 102 may be configured as a traditional computer (e.g., a desktop personal computer, laptop computer, and so on), a mobile station, an entertainment appliance, a set-top box communicatively coupled to a television, a wireless phone, a netbook, a game console, and so forth. Thus, the computing device 102 may range from full resource devices with substantial memory and processor resources (e.g., personal computers, game consoles) to a low-resource device with limited memory and/or processing resources (e.g., traditional set-top boxes, hand-held game consoles). The computing device 102 may also relate to software that causes the computing device 102 to perform one or more operations.

The computing device 102 is illustrated as including an input module 104. The input module 104 is representative of functionality relating to inputs of the computing device 102. For example, the input module 104 may be configured to receive inputs from a keyboard, mouse, to identify gestures and cause operations to be performed that correspond to the gestures, and so on. The inputs may be identified by the input module 104 in a variety of different ways.

For example, the input module 104 may be configured to recognize an input received via touchscreen functionality of a display device 106, such as a digitizer panel. The input module 104 may operate to detect a finger of a user's hand 108 as contacting of being within a threshold distance/proximity to the display device 106 of the computing device 102, recognize and resolve input provide via a stylus 110, and so on. The input may take a variety of different forms, such as to recognize movement of the stylus 110 and/or a finger of the user's hand 108 across the display device 106, pressing and tapping on the digitizer panel, drawing of a line, and so on. In implementations, various inputs may be recognized as gestures.

A variety of different types of gestures may be recognized, such a gestures that are recognized from a single type of input (e.g., touch gestures) as well as gestures involving multiple types of inputs. For example, the computing device 102 may be configured to detect and differentiate between a touch input (e.g., provided by one or more fingers of the user's hand 108) and a stylus input (e.g., provided by a stylus 110). The differentiation may be performed in a variety of ways, such as by detecting an amount of the display device 106 that is contacted by the finger of the user's hand 108 versus an amount of the display device 106 that is contacted by the stylus 110. Differentiation may also be performed through use of a camera to distinguish a touch input (e.g., holding up one or more fingers) from a stylus input (e.g., holding two fingers together to indicate a point) in a natural user interface (NUI). A variety of other example techniques for distinguishing touch and stylus inputs are contemplated.

Thus, the input module 104 may support a variety of different gesture techniques by recognizing and leveraging a division between stylus and touch inputs. For instance, the input module 104 may be configured to recognize the stylus as a writing tool, whereas touch is employed to manipulate objects displayed by the display device 106. Consequently, the combination of touch and stylus inputs may serve as a basis to indicate a variety of different gestures. For instance, primitives of touch (e.g., tap, hold, two-finger hold, grab, cross, pinch, hand or finger postures, and so on) and stylus (e.g., tap, hold-and-drag-off, drag-into, cross, stroke) may be composed to create a space involving a plurality of gestures. It should be noted that by differentiating between stylus and touch inputs, the number of gestures that are made possible by each of these inputs alone is also increased. For example, although the movements may be the same, different gestures (or different parameters to analogous commands) may be indicated using touch inputs versus stylus inputs.

The computing device 102 is further illustrated as including a stylus control module 112. The stylus control module 112 is representative of functionality of the computing device relating to operation of the stylus 110 and processing of input obtained via the stylus. For example, the stylus control module 112 may be configured to perform one or more actions responsive to the stylus 110, such as to draw lines as illustrated by the handwritten freeform lines in the display device 106 that illustrate "Hi" and "Robyn."

Thus, the stylus control module 112 may be further configured to perform a variety of different writing operations, such as to draw a line to mimic a pencil, pen, brush, and so on. The stylus control module 112 may also recognize the stylus 110 to perform erase operations, such as to mimic a rubber eraser and erase portions of a user interface. Thus, the stylus control module 112 additionally provides interaction via the stylus 110 that is intuitive and natural to a user.

In accordance with techniques described herein, the stylus control module 112 is further configured to recognize the stylus and resolve positions of a tip portion and body of the user relative to the computing device. In implementations, stylus recognition and position resolution are based on analysis of signal patterns or "signatures" derived from signals communicated via by the stylus. The signals may be generated and communicated via multiple separate and distinct electrodes integrated with the stylus and corresponding communication channels established via the electrodes as described above and below. The combined signal signatures produced by the multiple separate and distinct electrodes can be mapped to different contexts including different interaction modes, stylus positions, hand positions, user positions, and scenarios. Accordingly, the stylus control module 112 can recognize different signal patterns and match the different signal signatures to corresponding contexts. The stylus control module 112 further operates provide commands, messages, and/or control signals to direct operation of the computing device and stylus to selectively make adaptations and trigger actions in dependence upon recognized signal signatures and contexts. Directing operations includes, but is not limited to, adapting the user interface, causing the stylus to switch between modes, launching or closing applications, rendering results of input, triggering actions linked to gestures, providing feedback communication(s) to the stylus, resolving and correcting stylus position, computing stylus and/or hand hovering, hover height awareness, and scenario-based compensation for palm/hand interference.

As further depicted in FIG. 1, the stylus 110 may include a variety of different types of circuitry 114. For example, the circuitry 114 may include location-assistance circuitry 116 to aid the stylus control module 112 in determining an XY location of the stylus 110 in relation to the display device 106. In an implementation, the circuitry may also include a radio 118 to support communication with the stylus control module 112, such as to communicate data used in determination of the XY location. To power the circuitry 114, the stylus 110 includes a battery 120.

The stylus 110 is also illustrated as including a usage module 122. The usage module 122 is representative of functionality of the stylus 110 to enter different usage modes. For example, the usage module 122 may support an active mode 124 in which circuitry 114 of the stylus 110 is made active and therefore permitted to consume power from the battery 120. Thus, the circuitry 114 is available for use, such as to assist in providing signals, communication and/or an XY location to the computing device 102 and for receiving and processing data conveyed from the computing device 102 to the stylus 110.

The usage module 122 may also support a battery-conservation mode 126 to conserve power of the battery 120, such as to make circuitry 114 such as the location-assistance circuitry 116, the radio 118, and so on inactive to minimize consumption of the battery 120. In this way, the usage module 122 may enter a low power state and conserve resources of the battery 120 yet enable functionality of the circuitry 114 at appropriate times.

A variety of different techniques may be employed by the usage module 122 to determine when to switch between the modes. For example, the usage module 122 may employ a contact sensor or sensors to determine whether a user's hand 108 has grasped the stylus 110. The contact sensors are configured to detect contact or lack of contact with the stylus 110. The usage module 122 may then cause the stylus to enter the active mode 124 (e.g., "wake-up") when the stylus is grasped and enter the battery-conservation mode 126 (e.g., "sleep" or "shut-down") when the stylus is not (e.g., after a defined time period has elapsed). The contact sensors may assume a variety of different configurations to detect grasping of and contact with the stylus. Generally, the contact sensors are designed to recognize touching or movement of the stylus indicative of a user picking up, holding, carrying and/or using the stylus.

For example, touch-based sensors may be configured as conductive strips to detect portions of the user's hand 108 that are used to grasp the stylus 110. Additionally, the sensors may employ capacitive, resistive, and other techniques (e.g., photographic, positional, pressure, and so on) to detect when the user is holding the stylus 110. For instance, the sensors may be activated by a change in impedance (e.g., moisture or capacitive) so as to provide an ability to detect a user's hand 108 when wearing gloves. Movement based sensors may be configured as accelerometers, infrared devices, magnetic devices, or optical devices, to name a few example. Mechanical buttons, switches, and keys may also be employed to trigger switches between different modes.

To implement stylus communications channels as described herein, the stylus 110 may further include one or more electrodes configured to establish corresponding communication channels for transmitting and receiving data (e.g., data exchange between the stylus and computing device). For example, the stylus may include at least one grip electrode 128. The grip electrode is arranged in a grip area of a housing portion of the stylus and is configured to form a communication channel with the computing device. The communication channel routes through the grip area and through a body of a user (e.g., a user's hand or other body part) when the user is in contact with the grip area. In comparison to traditional systems that rely solely on tip electrodes, the grip electrode 128 can provide a larger coupling/contact region with the digitizer panel which can increase bandwidth, sensitivity of position calculations, transmission rates, and so forth. In implementations, the grip electrode 128 may operate as a contact sensor in addition to forming the communication channel. In this way, contact sensors employed in some device designs are leveraged to implement an intentional communication channel. Of course, a grip electrode 128 may also be formed as a dedicated component used for establishing the communication channel this is separate from any contact sensors.

A grip electrode 128 may be employed individually or in combination with one or more additional electrodes. For instance, additional electrodes may be disposed in the stylus housing. The grip electrode 128 may also be used in combination with one or more additional electrodes disposed in a tip portion of the stylus. For example, the stylus may include a tip electrode 130 arranged in the tip portion that is configured to form a communication channel with the computing device through the tip portion. The tip electrode 130 may be employed along with the grip electrode 128 to establish multiple corresponding communication channels. In this approach, a combined signal signature generated via the multiple electrodes can be analyzed and interpreted to recognize different interaction contexts as previously described. Although depicted in FIG. 1 as separate components, one or more electrodes may alternatively be included as components of the circuitry 114 Details regarding these and other aspects of techniques to implement stylus communication channels are discussed in detail in relation to the following figures.

Generally, any of the functions described herein can be implemented using software, firmware, hardware (e.g., fixed logic circuitry), or a combination of these implementations. The terms "module," "functionality," and "logic" as used herein generally represent software, firmware, hardware, or a combination thereof. In the case of a software implementation, the module, functionality, or logic represents program code that performs specified tasks when executed on a processor (e.g., CPU or CPUs). The program code can be stored in one or more computer readable memory devices. The features of the stylus mode techniques described below are platform-independent, meaning that the techniques may be implemented on a variety of commercial computing platforms having a variety of processors.

Figure 2:
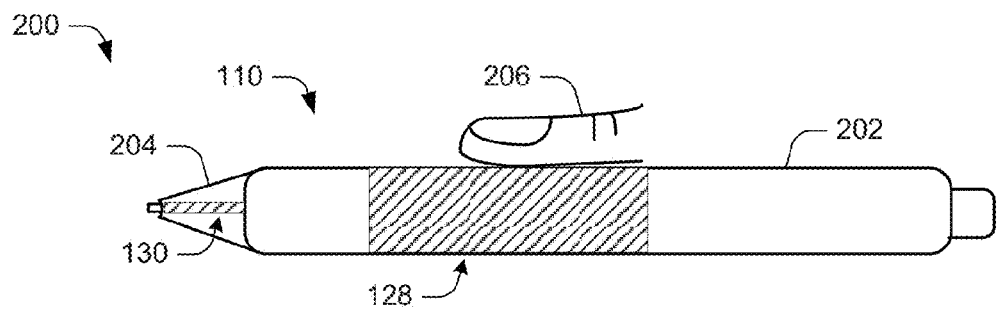
FIG. 2 depicts a stylus of FIG. 1 showing an example configuration of electrodes in accordance with one or more implementations.

FIG. 2 depicts the stylus 110 of FIG. 1 in an example implementation 200 showing an example configuration that employs multiple electrodes capable of establishing separate and distinct communication channels. In this example, the stylus 110 is formed to include a housing portion 202 and a tip portion 204 shaped to mimic a writing implement, e.g., a pen in the illustrated example although other configurations are also contemplated. The housing portion 202 includes a grip electrode 128. In this example, the grip electrode 128 is located within a grip area of the housing portion. The grip electrode 128 may be configured in various ways, such as a conductive strip or band that extends axially at least partially along the housing portion. The grip electrode 128 may also wrap at least partially around a circumference of the housing portion 202. In this example, the grip electrode 128 is represented as a conductive band that extends along the housing in the grip area and wraps completely around the housing portion 202, similar to a grip for a pencil or pen. Other configurations are also contemplated, further examples of which are discussed in relation to the following figures.

As noted, the grip electrode 128 is configured to form a communication channel with a computing device through the grip area and through a body of a user when the user is in contact with the grip area. For instance, a finger 206 of the user's hand is illustrated as being in contact with the grip electrode 128. This may occur when a user is grasping or holding the stylus 110. In this scenario, a signal generated via the grip electrode 128 and/or circuitry 114 of the stylus establishes a communication channel that is routed through the grip area and through the user's hand/body to the computing device.

Specifically, the signal is conveyed for recognition by a digitizer panel via a closed loop formed when the user's hand/body is in contact with or in close proximity to (e.g., within a threshold distance from) the surface of the digitizer. In a typical scenario, a user may rest their hand/palm on the display when using a stylus to provide writing input. The communication channel established via the grip electrode 128 may be employed to transmit data to and receive data from the computing device. The signal(s) conveyed via the communication channel may also facilitate actions related to stylus use including, but not limited to, recognition and pairing of the stylus with a device, resolving positions of the stylus and user/user's hand, recognizing an interaction context, inferring user intent, setting modes for the stylus, and so forth.

The tip portion 204 also includes another electrode indicated as a tip electrode 130. The tip electrode 130 forms a communication channel with the computing device through the tip portion 204. Accordingly, the stylus may include multiple electrodes that are used in combination as represented by the tip electrode 130 and the grip electrode 128. The multiple electrodes enable multiple separate and distinct communication channels used to detect the stylus, resolve positions of the stylus and a user relative to a computing device, and exchange data with the computing device (e.g., transmit and receive communications). In contrast to conventional techniques, electrodes for data communication (e.g., uplink and downlink) are not confined to the tip portion. Rather, the user contact with the stylus in the grip area is leveraged to enable an alternative or additional communication channel/route. As noted, this channel through the grip area may be associated with additional and/or greater bandwidth and data communication capabilities as the region of a user's hand/palm/body used to establish the channel is relatively large in comparison to the region of the tip used in traditional approaches. Moreover, using and interpreting signals from multiple electrodes in combination can improves accuracy and sensitivity of stylus operation. The combined signals enable the system to infer information that may be difficult to determine using just a tip electrode, such as hand position relative to the digitizer, lifting of the hand, hand hovering, lifting of the tip while still resting the hand/palm, and so forth. These and other scenarios may be recognized as different kinds of interactions and used to drive corresponding actions and responses.

Figure 3:
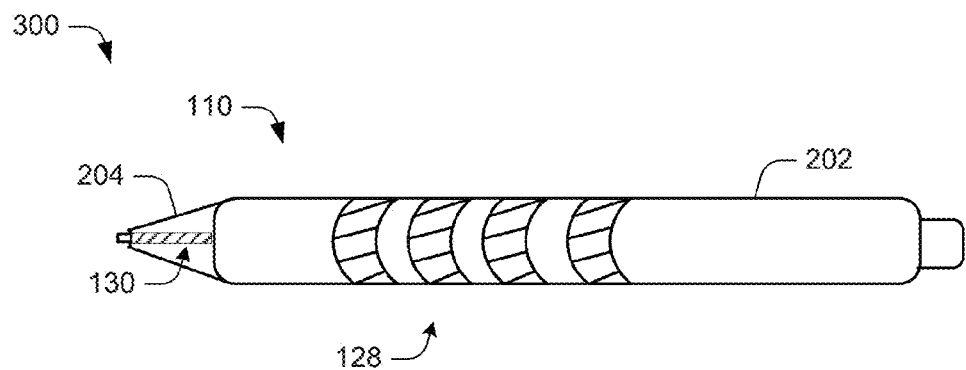
FIG. 3 depicts a stylus of FIG. 1 showing another example configuration of electrodes in accordance with one or more implementations.

As noted, various configurations of a stylus 110 and grip electrode 128 are contemplated. For example, FIG. 3 depicts generally at 300 a stylus 110 in which the grip electrode 128 is configured as a plurality of conductive elements disposed along the housing portion 202. In the depicted example, the conductive elements are illustrated as multiple bands or rings that are spaced apart within the grip area along a longitudinal axis of the stylus. The bands or rings may also wrap fully or partially around the circumference of the stylus. Although, bands or rings are shown, the conductive elements may have various other shapes, sizes, and arrangements such as a series of strips, circular contact points, or protruding elements, to name a few examples. This configuration using multiple conductive elements enables the grip electrode 128 to function effectively for a variety of different grasping positions, hand sizes, and users. The example stylus of FIG. 3 also may include a tip electrode 130 in a tip portion 204 as previously described.

Figure 4:
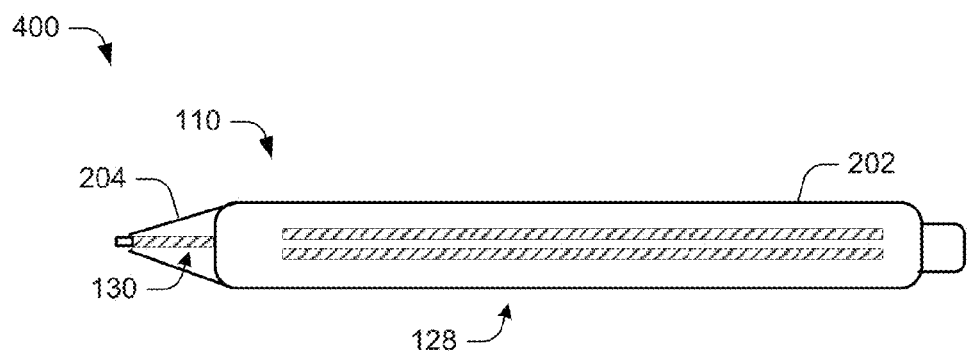
FIG. 4 depicts a stylus of FIG. 1 showing a further example configuration of electrodes in accordance with one or more implementations.

In another example, FIG. 4 depicts generally at 400 a stylus 110 in which the grip electrode 128 is configured as one or more of conductive elements extending lengthwise along the housing portion 202. In the depicted example, the conductive elements are illustrated as a pair of strips that extend along a substantial portion (e.g., at least half the length) of the longitudinal axis of the stylus. In this example, the grip electrode 128 may be located at least partially outside of a "normal" grip area associated with interaction such as navigation and writing. This configuration using multiple conductive elements extending lengthwise may facilitate use of the grip electrode 128 to support a wide range of interaction scenarios with different grasping points along the housing. For example, the stylus 110 may be used as a brush or wand with a grasping position on an opposite end from the tip in addition to being used for navigation and writing with a grasp in the grip area closer to the tip end. The example stylus of FIG. 4 also may include a tip electrode 130 in a tip portion 204 as previously described. Various other examples are also contemplated.

It is further noted that different electrodes and conductive elements associated with the electrodes may be activated and deactivated at different times. In other words, electrodes and elements may be shut off or placed in a low power state when not in use to conserve power. Each individual electrode and conductive element (e.g., each ring, strip, etc.) may be toggled on/off independently of other elements and electrodes. To do so, the elements/electrodes may be coupled to a touch sensitive switching mechanism, such as a capacitive sensing circuit. The touch sensitive switching mechanism enables identification of particular elements that are in use and not in use. The system employs this information to selectively turn elements on or off accordingly. Signals to support stylus communications are then routed through the active elements that are turned-on to optimize the communication and simultaneously converse power by deactivating elements and electrodes when not in use.

In order for the multiple electrodes (tip and grip electrodes) to establish separate and distinct communication channels, the stylus 110 is configured to generate and transmit different signals for each electrode. Accordingly, a transmitter may be included for each electrode to produce a corresponding signal. The stylus 110 may also include at least one receiver capable of obtaining signals communicated from the computing device/digitizer and may have a separate receiver associated with each electrode. In an implementation, each electrode includes or is associated with a transmitter and receiver to enable uplink and downlink communications via corresponding channels that are formed in the manner described herein. Generally, signal intensity increases as the stylus is moved closer to the computing device and intensity is greater still when contact is made with the digitizer panel surface. Thus, the computing device is able to detect the stylus and resolve the position of the stylus based on the signal intensity.

The signals may be configured as AC voltage signals or other detectable signals. Different signals associated with different electrodes may have different characteristics to enable the computing device to distinguish between the different signals. For example, the signals may have different signal strengths, frequencies, and/or patterns. Additional, the different paths for the signals are associated with different impedances and consequently the voltage induced through different paths is also different. Thus, the tip signal can be distinguished from the grip signal based on the different characteristics of the signals and paths.

Figure 5:
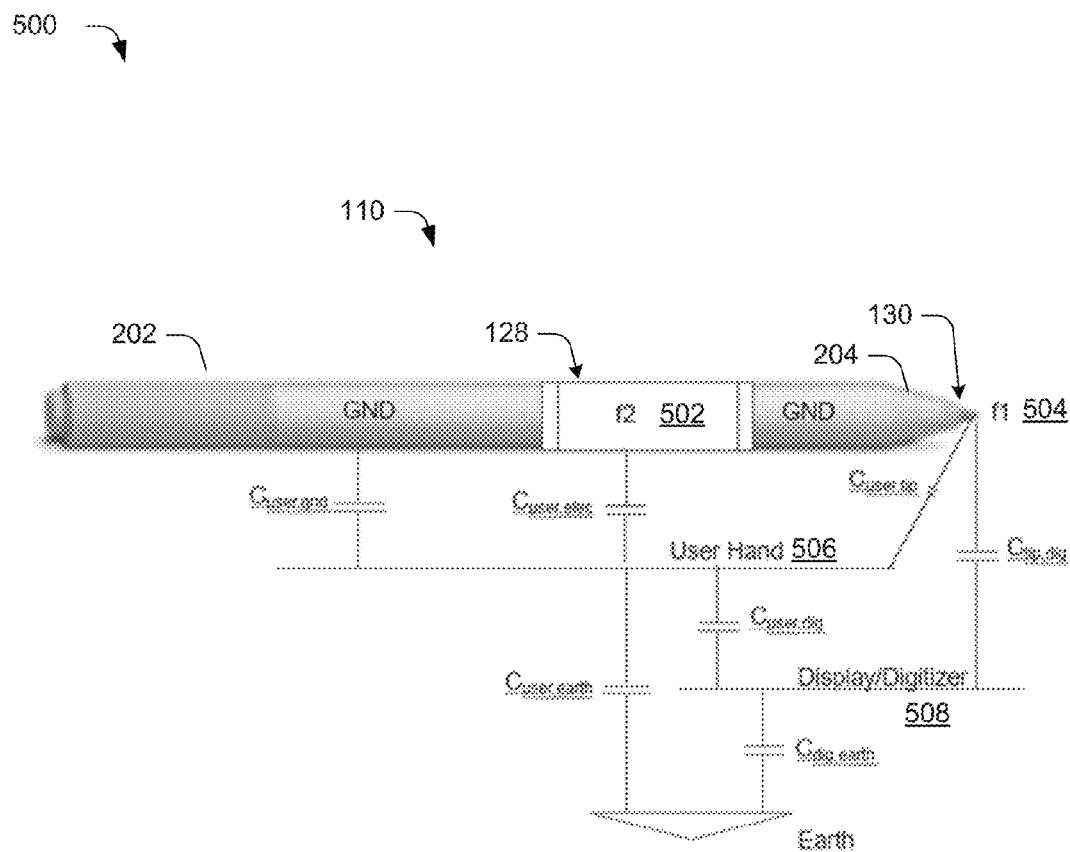
FIG. 5 is a diagram representing a physical model for a stylus having multiple electrodes to form multiple communication channels in accordance with one or more implementations.

To further illustrate, consider FIG. 5 which depicts generally at 500 a representation of a physical model for a stylus 110 having a grip electrode 128 and a tip electrode 130 as discussed herein. The stylus is configured to generate a f1 signal 502 associated with the grip electrode 128 and a f2 signal 504 associated with the tip electrode. The f2 signal is routed through the user hand 506 to the display/digitizer 508 where the signal may be detected and analyzed. Likewise, the f1 signal is conveyed from the tip portion 204 to the display/digitizer 508 where the signal may also be detected and analyzed. Components of the f1 and f2 signals also are passed through the other channels such that f1 is passed/detectable through the user hand 506 and f2 is passed/detectable through the tip portion 204.

The voltage induced on the display/digitizer 508 follows from the voltage input for the signals and capacitance division, and is different for f1 and f2 as well as being different for different paths. Consequently, the multiple signals may be detected by the display/digitizer 508 and interpreted to resolve positions of the stylus 110, tip portion 204, user hand 506 and so forth. Signal intensity of the signals may also be used to determine hover height, contact with the digitizer, movement of the stylus/hand and so forth.

Figure 6:
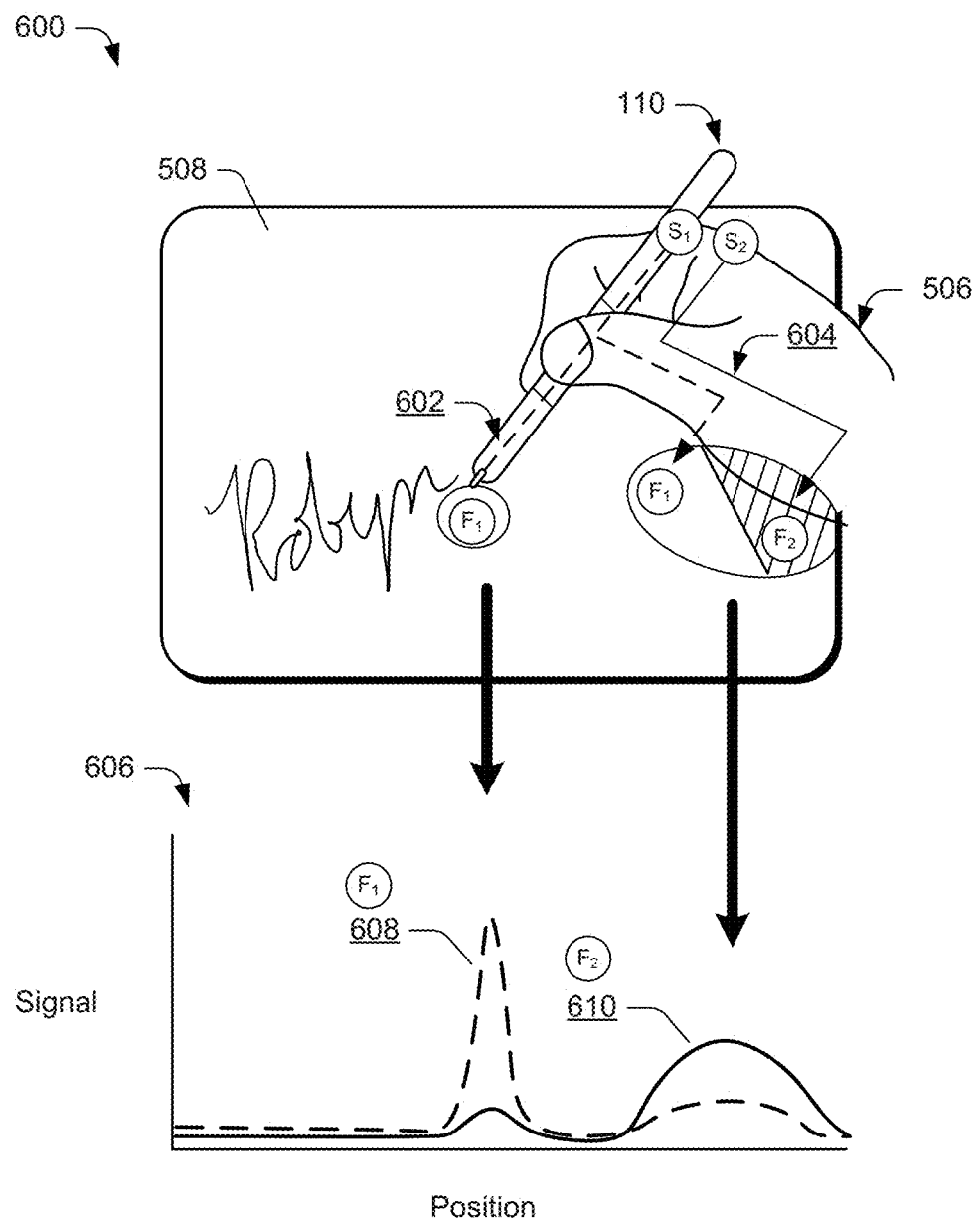
FIG. 6 is a diagram representing an example scenario for detection of signals transmitted by a stylus in accordance with one or more implementations.

In this context, FIG. 6 depicts generally at 600 an example scenario in which signals from multiple electrodes of a stylus are employed for detection and position resolution. In particular, FIG. 6 shows an example in which a user is interacting with a device by using a stylus 110 with a display/digitizer 508. In this example, the user hand 506 is resting with the palm in contact with the digitizer and the stylus tip also in contact with the display/digitizer 508 to enable writing. Signals f1 and f2 associated with a tip electrode 130 and grip electrode 128 are also represented along with corresponding routes for the signal. In particular pathways 602 for signal f1 are represented by the dashed line and pathways 604 for the signal f2 are represented by the solid line.

As represented, both signals f1 and f2 are conveyed via the user's hand and contribute to the voltage signal at the position of the user's hand/palm. There may also be some contribution of f2 through the tip, but the contribution is small enough that the signal at the tip can effectively be treated as being from just the f1 signal. These contributions are represented by the elliptical regions shown in the areas of contact with the display/digitizer in FIG. 6.

A graph 606 corresponding to the example scenario is also shown, which represents the corresponding output signals that are produced. In the graph, the signal intensity is plotted against the position on the display/digitizer. The f1 signal is represent by the dashed line 608 and the f2 signal is represent by the solid line 610. Notice that there is a sharp peak for the f1 signal corresponding to the tip region indicating the position of the tip and that the tip is in contact with the digitizer based on the intensity. The additional gradual hump associated with f1 in the palm region provides further indication that the tip is in contact. Likewise, the gradual hump associated with f2 in the palm region indicates the location of the palm as well as contact of the palm/hand with the display/digitizer. A small, but effectively negligible contribution from f2 in the tip region is also shown. Thus, in this scenario the signature of the combined signals indicates that the tip and palm are resting on the display as well as the positions of the tip and palm.

In general, the computing device 102 through the stylus control module 112 or otherwise is able to recognize different signatures for the combined signals that are indicative of different interaction contexts. A signature mapping database or other data structure may be maintained to store mapping data that maps different known signatures to corresponding contexts and actions. The stylus control module 112 may reference the mapping data to match a detected signature to known signatures and then trigger corresponding actions. For instance, the scenario of FIG. 6 is indicative of an active/writing context and will trigger actions associated with an active mode and/or writing interaction. If the stylus tip is lifted, then the sharp peak in the example of FIG. 6 will diminish or disappear. If at the same time, the palm signal remains unchanged, this indicates that the user is still engaged and perhaps just pausing their writing to think. On the other hand, if the palm is also lifted and the peak in the palm region disappears, this may indicate that the user is done.

Figure 7:
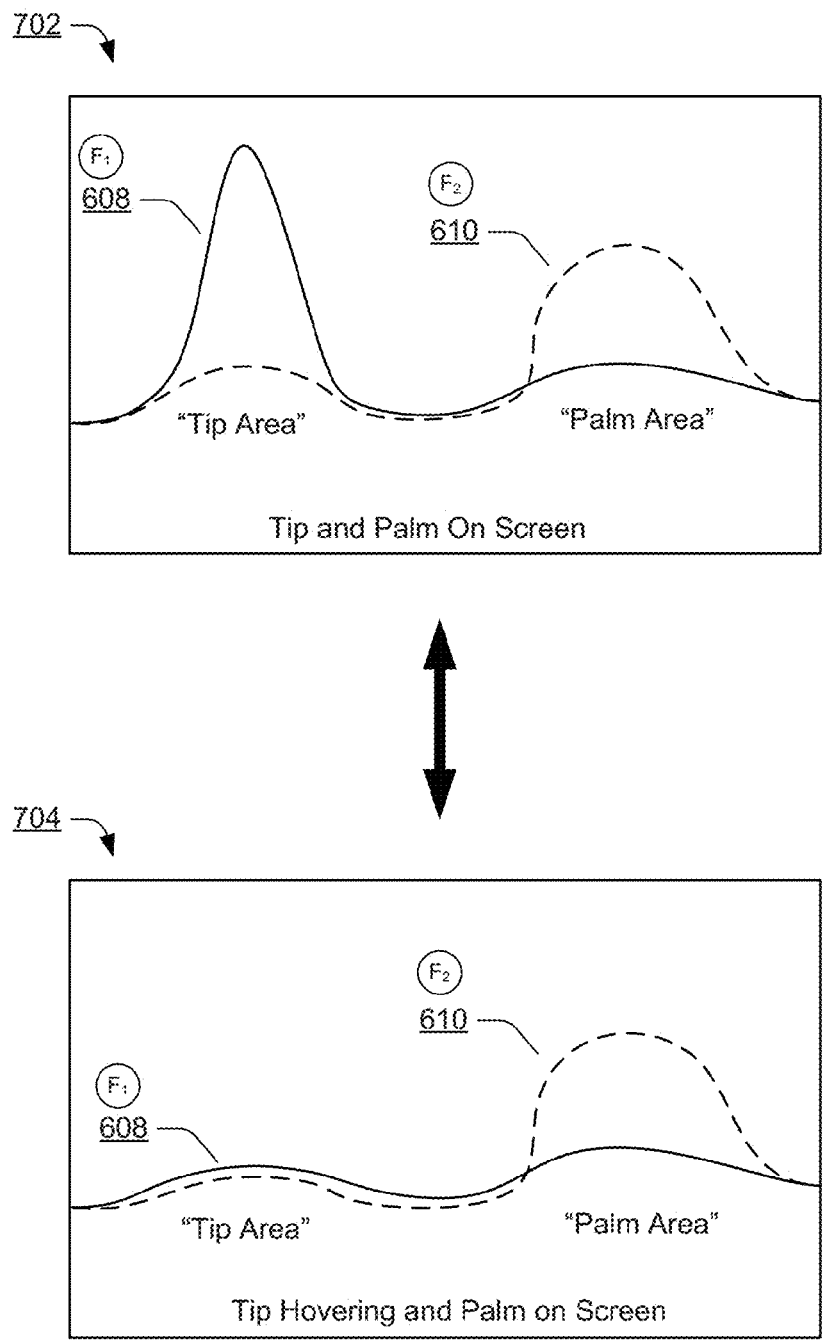
FIG. 7 is a diagram showing a comparison of signals detected in different scenarios in accordance with one or more implementations.

To further illustrate, FIG. 7 depicts generally at 700 FIG. 7 a diagram showing a comparison of signals detected in different scenarios in accordance with one or more implementations. In particular, signals detected when the tip and palm are placed on the screen digitizer are represented at 702. In this scenario, similar to the example represented in FIG. 6, the f1 signal corresponding to the tip shows a peak in the "tip area" and a relatively flat bump in the "palm area." The f2 signal corresponding to the grip/hand is relatively flat in the "tip area" and has a fairly large hump in the "palm area".

By way of comparison, signals detected when the tip is hovering and the palm remains placed on the screen digitizer are represented at 704. In this scenario, the f1 signal corresponding to the tip is relatively flat in both the "tip and the "palm area" since the tip is hovering above the screen. The f2 signal, though, stays consistent with a relatively flat shape in the "tip area" and the large hump in the "palm area" since the palm is still in contact with the screen. Differences in the signal signatures between different scenarios such as the examples shown in FIG. 7 can be detected and interpreted to understand and differentiate between different ways in which a user interacts with the device. In this manner, different modes and operations may be selectively triggered based on contextual indications gleaned from the signature of the combined signals. Further details are discussed in relation to the following example procedures.

Example Procedures

The following discussion describes techniques that may be implemented utilizing the previously described systems and devices. Aspects of each of the procedures may be implemented in hardware, firmware, software, or a combination thereof. The procedures are shown as a set of blocks that specify operations performed by one or more devices and are not necessarily limited to the orders shown for performing the operations by the respective blocks.

In general, functionality, features, and concepts described in relation to the examples above and below may be employed in the context of the example procedures described in this section. Further, functionality, features, and concepts described in relation to different figures and examples in this document may be interchanged among one another and are not limited to implementation in the context of a particular figure or procedure. Moreover, blocks associated with different representative procedures and corresponding figures herein may be applied together and/or combined in different ways. Thus, individual functionality, features, and concepts described in relation to different example environments, devices, components, figures, and procedures herein may be used in any suitable combinations and are not limited to the particular combinations represented by the enumerated examples in this description.

Figure 8:
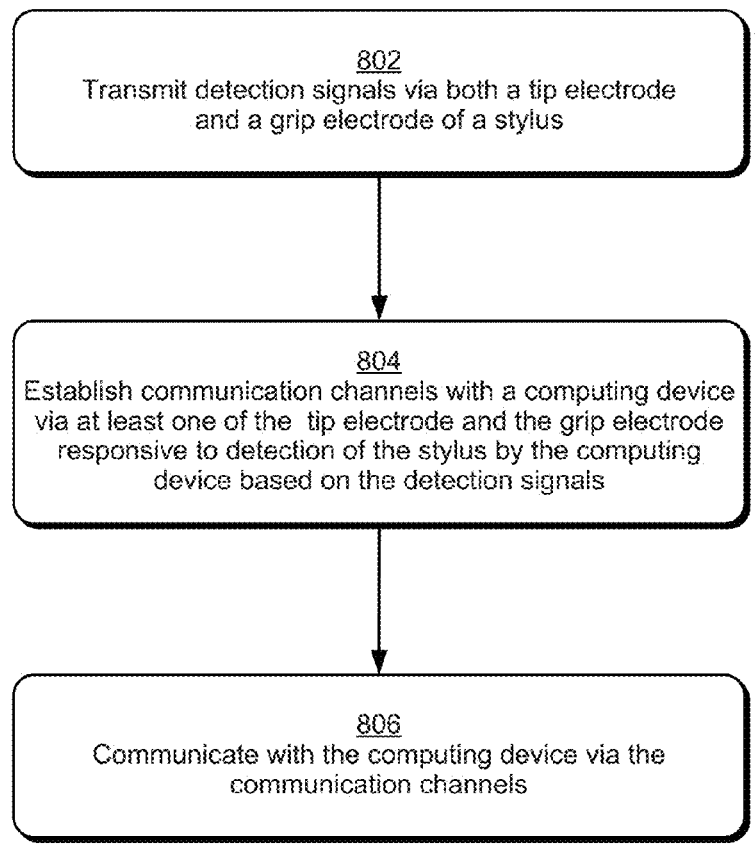
FIG. 8 is a flow diagram depicting an example procedure in which communication channels established using multiple electrodes are employed for stylus operations in accordance with one or more implementations.

FIG. 8 depicts a procedure 800 in an example implementation in which communication channels established using multiple electrodes are employed for stylus operations. Detection signals are transmitted via both a tip electrode and a grip electrode of a stylus (block 802). For example, a stylus 110 having at least a grip electrode 128 and a tip electrode 130 may generate signals as previously discussed. The signals may be communicated for detection by a computing device 102 having functionality to detect and interpret the signals, such as stylus control module 112.

Communication channels are established with a computing device via at least one of the tip electrode and the grip electrode responsive to detection of the stylus by the computing device based on the detection signals (block 804). In accordance with techniques described herein, different signals may be associated with different electrodes. This enables multiple separate and distinct communication channels to be established. For example, the grip electrode 128 may be configured to establish one channel through a user's hand/body and the tip electrode 130 may be used to establish another channel through a tip of the stylus 110.

Then, communications occur with the computing device via the communication channels (block 806). As noted, the communication channels may be employed to detect the presence of the stylus 110 as well as positions of the stylus, tip, user, and user's hand/body. Moreover, the communication channels enable uplink and downlink communication for bi-directional data exchange between the stylus 110 and the computing device 102.

Figure 9:
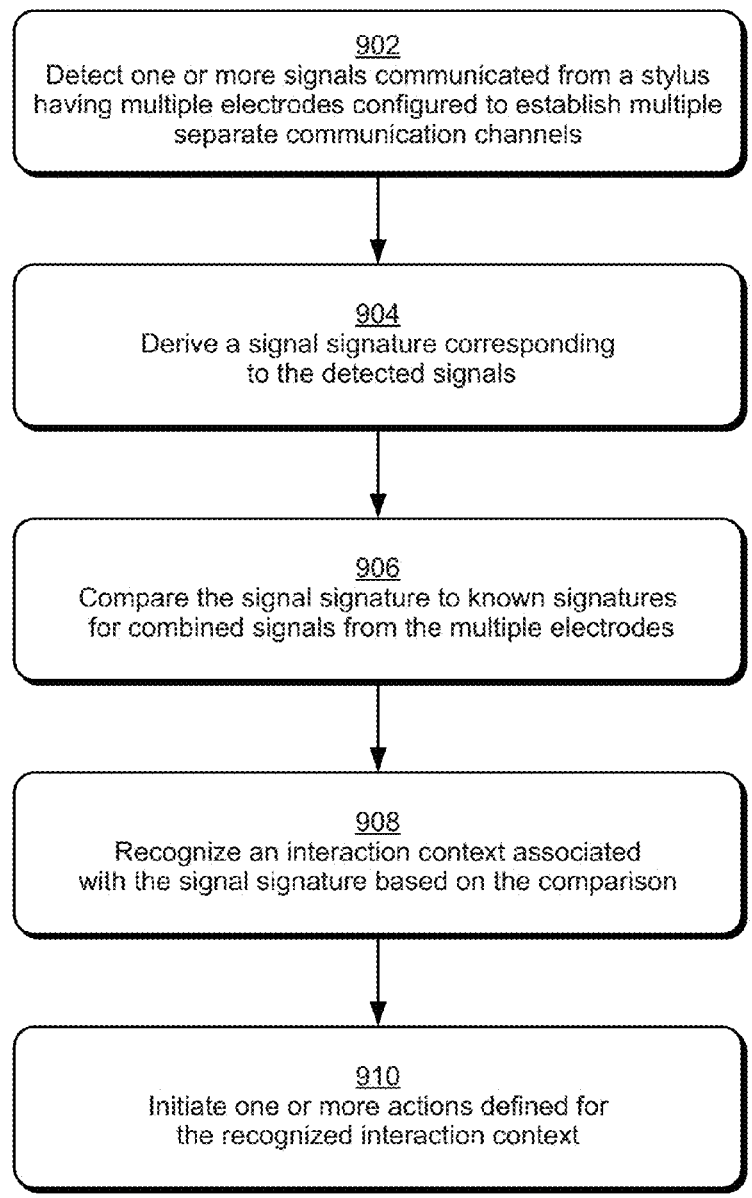
FIG. 9 is a flow diagram depicting an example procedure in which combined signals from multiple electrodes are used to drive corresponding actions in accordance with one or more implementations.

FIG. 9 depicts a procedure 900 in an example implementation in which combined signals from multiple electrodes are used to drive corresponding actions. One or more signals are detected that are communicated from a stylus having multiple electrodes configured to establish multiple separate communication channels (block 902). For example, a computing device 102 may include functionality to detect and interpret signals transmitted by a stylus 110, such as stylus control module 112 or comparable functionality. The stylus 110 may be configured to implement one or more grip electrodes 128, which may be used individually or in combination with additional electrodes, such as one or more tip electrodes 130. The different electrodes are employed to transmit signals that are used to establish multiple separate communication channels between the computing device 102 and stylus 110. Establishment of the communication channels may occur under the influence of the stylus control module 112, which is configured to provide signals and commands to direct operation of the stylus 110.

A signal signature corresponding to the detected signals is derived (block 904) and the signal signature is compared to known signatures for combined signals from the multiple electrodes (block 906). For example, a stylus control module 112 or equivalent functionality may reference mapping data indicative of different known signatures for signals from a stylus 110 as previously described. Here, a detected signal is compared against a database of defined patterns to match the detected signal to a known signature. Then, an interaction context associated with the signal signature is recognized based on the comparison (block 908). For example, the known signature may indicate a particular interaction context such as a stylus/hand position, a gesture, a user intent and so forth. Interaction contexts may include a set of developer defined contexts as well as user-defined and customized contexts. Responsive to the recognition, one or more actions defined for the recognized interaction context are initiated (block 910). As noted, different interaction contexts may be mapped to corresponding actions. Example actions include, but a are not limited to, navigation operations, changing modes of the device, stylus mode changes, altering power states, launching applications, output of alerts or notifications, and capturing input to name a few examples. The stylus control module 112 may operate to direct operations of the stylus and program application of the host device to implement specified actions in dependence upon the recognized context. The actions and context are determined based at least in part upon detection and interpretation of signals from a stylus that employs multiple electrodes in accordance with the techniques described herein.

Example System

Figure 10:
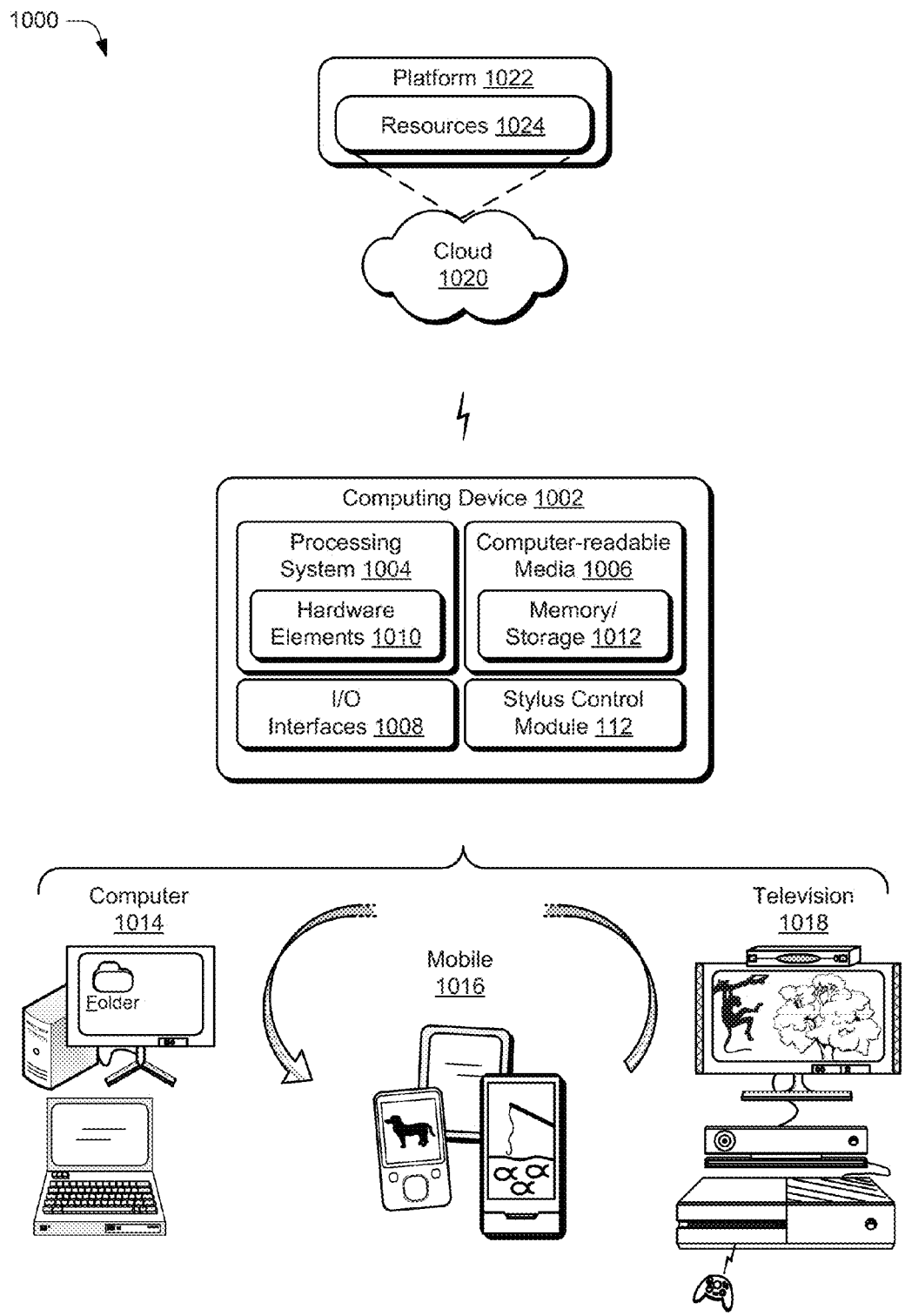
FIG. 10 illustrates various components of an example system that can implement aspects of the stylus communication channel techniques described herein in accordance with one or more implementations.

FIG. 10 illustrates an example system 1000 that includes an example computing device 1002 that is representative of one or more computing systems and/or devices that may implement the various techniques described herein. The computing device 1002 may be, for example, a server of a service provider, a device associated with a client (e.g., a client device), an on-chip system, and/or any other suitable computing device or computing system.

The example computing device 1002 as illustrated includes a processing system 1004, one or more computer-readable media 1006, and one or more I/O interfaces 1008 that are communicatively coupled, one to another. Although not shown, the computing device 1002 may further include a system bus or other data and command transfer system that couples the various components, one to another. A system bus can include any one or combination of different bus structures, such as a memory bus or memory controller, a peripheral bus, a universal serial bus, and/or a processor or local bus that utilizes any of a variety of bus architectures. A variety of other examples are also contemplated, such as control and data lines.

The processing system 1004 is representative of functionality to perform one or more operations using hardware. Accordingly, the processing system 1004 is illustrated as including hardware elements 1010 that may be configured as processors, functional blocks, and so forth. This may include implementation in hardware as an application specific integrated circuit or other logic device formed using one or more semiconductors. The hardware elements 1010 are not limited by the materials from which they are formed or the processing mechanisms employed therein. For example, processors may be comprised of semiconductor(s) and/or transistors (e.g., electronic integrated circuits (ICs)). In such a context, processor-executable instructions may be electronically-executable instructions.

The computer-readable media 1006 is illustrated as including memory/storage 1012. The memory/storage 1012 represents memory/storage capacity associated with one or more computer-readable media. The memory/storage 1012 may include volatile media (such as random access memory (RAM)) and/or nonvolatile media (such as read only memory (ROM), Flash memory, optical disks, magnetic disks, and so forth). The memory/storage 1012 may include fixed media (e.g., RAM, ROM, a fixed hard drive, and so on) as well as removable media (e.g., Flash memory, a removable hard drive, an optical disc, and so forth). The computer-readable media 1006 may be configured in a variety of other ways as further described below.

Input/output interface(s) 1008 are representative of functionality to allow a user to enter commands and information to computing device 1002, and also allow information to be presented to the user and/or other components or devices using various input/output devices. Examples of input devices include a keyboard, a cursor control device (e.g., a mouse), a stylus, a microphone for voice operations, a scanner, touch functionality (e.g., capacitive or other sensors that are configured to detect physical touch), a camera (e.g., which may employ visible or non-visible wavelengths such as infrared frequencies to detect movement that does not involve touch as gestures), and so forth. Examples of output devices include a display device (e.g., a monitor or projector), speakers, a printer, a network card, tactile-response device, and so forth. Thus, the computing device 1002 may be configured in a variety of ways as further described below to support user interaction.

Various techniques may be described herein in the general context of software, hardware elements, or program modules. Generally, such modules include routines, programs, objects, elements, components, data structures, and so forth that perform particular tasks or implement particular abstract data types. The terms "module," "functionality," and "component" as used herein generally represent software, firmware, hardware, or a combination thereof. The features of the techniques described herein are platform-independent, meaning that the techniques may be implemented on a variety of commercial computing platforms having a variety of processors.

An implementation of the described modules and techniques may be stored on or transmitted across some form of computer-readable media. The computer-readable media may include a variety of media that may be accessed by the computing device 1002. By way of example, and not limitation, computer-readable media may include "computer-readable storage media" and "communication media."

"Computer-readable storage media" refers to media and/or devices that enable storage of information in contrast to mere signal transmission, carrier waves, or signals per se. Computer-readable storage media does not include signal bearing media, transitory signals, or signals per se. The computer-readable storage media includes hardware such as volatile and non-volatile, removable and non-removable media and/or storage devices implemented in a method or technology suitable for storage of information such as computer readable instructions, data structures, program modules, logic elements/circuits, or other data. Examples of computer-readable storage media may include, but are not limited to, RAM, ROM, EEPROM, flash memory or other memory technology, CD-ROM, digital versatile disks (DVD) or other optical storage, hard disks, magnetic cassettes, magnetic tape, magnetic disk storage or other magnetic storage devices, or other storage device, tangible media, or article of manufacture suitable to store the desired information and which may be accessed by a computer.

"Communication media" may refer to signal-bearing media that is configured to transmit instructions to the hardware of the computing device 1002, such as via a network. Communication media typically may embody computer readable instructions, data structures, program modules, or other data in a modulated data signal, such as carrier waves, data signals, or other transport mechanism. Communication media also include any information delivery media. The term "modulated data signal" means a signal that has one or more of its characteristics set or changed in such a manner as to encode information in the signal. By way of example, and not limitation, communication media include wired media such as a wired network or direct-wired connection, and wireless media such as acoustic, RF, infrared, and other wireless media.

As previously described, hardware elements 1010 and computer-readable media 1006 are representative of instructions, modules, programmable device logic and/or fixed device logic implemented in a hardware form that may be employed in some embodiments to implement at least some aspects of the techniques described herein. Hardware elements may include components of an integrated circuit or on-chip system, an application-specific integrated circuit (ASIC), a field-programmable gate array (FPGA), a complex programmable logic device (CPLD), and other implementations in silicon or other hardware devices. In this context, a hardware element may operate as a processing device that performs program tasks defined by instructions, modules, and/or logic embodied by the hardware element as well as a hardware device utilized to store instructions for execution, e.g., the computer-readable storage media described previously.

Combinations of the foregoing may also be employed to implement various techniques and modules described herein. Accordingly, software, hardware, or program modules including the input module 104, stylus control module 112 and other program modules may be implemented as one or more instructions and/or logic embodied on some form of computer-readable storage media and/or by one or more hardware elements 1010. The computing device 1002 may be configured to implement particular instructions and/or functions corresponding to the software and/or hardware modules. Accordingly, implementation of modules as a module that is executable by the computing device 1002 as software may be achieved at least partially in hardware, e.g., through use of computer-readable storage media and/or hardware elements 1010 of the processing system. The instructions and/or functions may be executable/operable by one or more articles of manufacture (for example, one or more computing devices 1002 and/or processing systems 1004) to implement techniques, modules, and examples described herein.

As further illustrated in FIG. 10, the example system 1000 enables ubiquitous environments for a seamless user experience when running applications on a personal computer (PC), a television device, and/or a mobile device. Services and applications run substantially similar in all three environments for a common user experience when transitioning from one device to the next while utilizing an application, playing a video game, watching a video, and so on.

In the example system 1000, multiple devices are interconnected through a central computing device. The central computing device may be local to the multiple devices or may be located remotely from the multiple devices. In one embodiment, the central computing device may be a cloud of one or more server computers that are connected to the multiple devices through a network, the Internet, or other data communication link.

In one embodiment, this interconnection architecture enables functionality to be delivered across multiple devices to provide a common and seamless experience to a user of the multiple devices. Each of the multiple devices may have different physical requirements and capabilities, and the central computing device uses a platform to enable the delivery of an experience to the device that is both tailored to the device and yet common to all devices. In one embodiment, a class of target devices is created and experiences are tailored to the generic class of devices. A class of devices may be defined by physical features, types of usage, or other common characteristics of the devices.

In various implementations, the computing device 1002 may assume a variety of different configurations, such as for computer 1014, mobile 1016, and television 1018 uses. Each of these configurations includes devices that may have generally different constructs and capabilities, and thus the computing device 1002 may be configured according to one or more of the different device classes. For instance, the computing device 1002 may be implemented as the computer 1014 class of a device that includes a personal computer, desktop computer, a multi-screen computer, laptop computer, netbook, and so on.

The computing device 1002 may also be implemented as the mobile 1016 class of device that includes mobile devices, such as a mobile phone, portable music player, portable gaming device, a tablet computer, a multi-screen computer, and so on. The computing device 1002 may also be implemented as the television 1018 class of device that includes devices having or connected to generally larger screens in casual viewing environments. These devices include televisions, set-top boxes, gaming consoles, and so on.

The techniques described herein may be supported by these various configurations of the computing device 1002 and are not limited to the specific examples of the techniques described herein. This is illustrated through inclusion of the stylus control module 112 the computing device 1002. The functionality represented by the stylus control module 112 and other modules/applications may also be implemented all or in part through use of a distributed system, such as over a "cloud" 1020 via a platform 1022 as described below.

The cloud 1020 includes and/or is representative of a platform 1022 for resources 1024. The platform 1022 abstracts underlying functionality of hardware (e.g., servers) and software resources of the cloud 1020. The resources 1024 may include applications and/or data that can be utilized while computer processing is executed on servers that are remote from the computing device 1002. Resources 1024 can also include services provided over the Internet and/or through a subscriber network, such as a cellular or Wi-Fi network.

The platform 1022 may abstract resources and functions to connect the computing device 1002 with other computing devices. The platform 1022 may also serve to abstract scaling of resources to provide a corresponding level of scale to encountered demand for the resources 1024 that are implemented via the platform 1022. Accordingly, in an interconnected device embodiment, implementation of functionality described herein may be distributed throughout the system 1000. For example, the functionality may be implemented in part on the computing device 1002 as well as via the platform 1022 that abstracts the functionality of the cloud 1020.

EXAMPLE IMPLEMENTATIONS

Example implementations of techniques described herein include, but are not limited to, one or any combinations of one or more of the following examples:

Example 1

An electronic stylus for a computing device comprising: a housing portion and a tip portion shaped to form the electronic stylus; a first electrode arranged in the tip portion configured to form a first communication channel with the computing device through the tip portion; and a second electrode arranged in a grip area of the housing portion configured to form a second communication channel with the computing device through the grip area and through a body of a user when the user is in contact with the grip area.

Example 2

The electronic stylus as described in any one or more of the examples in this section, wherein both the first electrode and the second electrode are configured to transmit data to and receive data from the computing device via the first communication channel and the second communication channel, respectively.

Example 3

The electronic stylus as described in any one or more of the examples in this section, wherein the second electrode is further configured as a sensor to detect contact of the user with the electronic stylus and in response cause the electronic stylus to enter an active mode.

Example 4

The electronic stylus as described in any one or more of the examples in this section, wherein the second electrode is further configured as a sensor to detect lack of contact with the user and in response cause the electronic stylus to enter a battery-conservation mode.

Example 5

The electronic stylus as described in any one or more of the examples in this section, wherein the housing portion is shaped to be grasped by a hand the user as a writing implement.

Example 6

The electronic stylus as described in any one or more of the examples in this section, wherein the second electrode comprises one or more conductive elements extending axially at least partially along the housing portion.

Example 7

The electronic stylus as described in any one or more of the examples in this section, wherein the second electrode comprises one or more conductive elements extending circumferentially at least partially around the housing portion.

Example 8

The electronic stylus as described in any one or more of the examples in this section, wherein the second communication channel formed via the second electrode provides additional bandwidth to transmit data to and receive data from the computing device relative to the first communication channel formed via the first electrode.

Example 9

The electronic stylus as described in in any one or more of the examples in this section, wherein the second electrode is configured to form the second communication channel through a hand of the user when the user is holding the electronic stylus.

Example 10

The electronic stylus as described in in any one or more of the examples in this section, wherein the body of the user operates to create a closed loop for the second communication channel when a portion of the body of the user is in contact with or within a threshold distance from the computing device.

Example 11

An electronic stylus as described any one or more of the examples in this section, further comprising circuitry to generate signals for operation of the first electrode and the second electrode, the signals detectable by the computing device to recognize the electronic stylus and resolve positions of the tip portion and a body of the user relative to the computing device.

Example 12

An electronic stylus as described in any one or more of the examples in this section, wherein the circuitry is configured to include a transmitter and a receiver for each of the first electrode and the second electrode.

Example 13

An electronic stylus as described any one or more of the examples in this section, wherein different signals having different characteristics are generated by the circuitry for the first electrode and the second electrode to enable the computing device to distinguish between the different signals.

Example 14

An apparatus comprising: a housing portion and a tip portion shaped to form an electronic stylus operable as an input device for providing input to a computing device; and an electrode arranged in a grip area of the housing portion configured to form a communication channel with the computing device through the grip area and through a hand of a user when the user is grasping the housing portion.

Example 15

An apparatus as described one or more of the examples in this section, wherein the communication channel is formed as a closed loop through the hand of the user when the hand is resting upon a digitizer panel of the computing device configured to recognize position of the electronic stylus based at least in part upon signals communicated via the communication channel.

Example 16

An apparatus as described one or more of the examples in this section, wherein the communication channel enables sending of data to and receiving of data from the computing device.

Example 17

An apparatus as described one or more of the examples in this section, wherein the electrode is associated with one or more signal signatures for a signal communicated via the electrode, the signal signatures conveying information to the computing device used to resolve positions of the tip portion and a hand of the user relative to the computing device.

Example 18

An apparatus as described one or more of the examples in this section, further comprising at least one additional electrode arranged in the tip portion configured to form an additional communication channel with the computing device through the tip portion.

Example 19

A system comprising: a computing device having a display device including a digitizer panel; an electronic stylus operable as an input device for providing input to the computing device via the digitizer panel, the electronic stylus including: a housing portion and a tip portion shaped to form the electronic stylus; a first electrode arranged in the tip portion configured to form a first communication channel with the computing device through the tip portion; and a second electrode arranged in a grip area of the housing portion configured to form a second communication channel with the computing device through the grip area and through a body of a user when the user is in contact with the grip area; and a stylus control module configured to recognize the electronic stylus and resolve positions of the tip portion and the body of the user relative to the computing device based on analysis of signal signatures derived from signals communicated by electronic stylus via the first electrode and second electrode.

Example 20

A method as described one or more of the examples in this section, wherein the stylus control module is implemented via a processing system of the computing device.

Conclusion

Although the invention has been described in language specific to structural features and/or methodological acts, it is to be understood that the invention defined in the appended claims is not necessarily limited to the specific features or acts described. Rather, the specific features and acts are disclosed as example forms of implementing the claimed invention.

What is claimed is:

1. An electronic stylus for a computing device comprising:
   a housing portion and a tip portion shaped to form the electronic stylus;
   a first electrode arranged in the tip portion configured to form a first communication channel with the computing device through the tip portion; and
   a second electrode arranged in a grip area of the housing portion configured to form a second communication channel with the computing device through the grip area and through a body of a user when the user is in contact with the grip area, a portion of the body of the user creating a closed loop for the second communication channel when in contact with or within a threshold distance from the computing device.

2. An electronic stylus as described in claim 1, wherein both the first electrode and the second electrode are configured to transmit data to and receive data from the computing device via the first communication channel and the second communication channel, respectively.

3. An electronic stylus as described in claim 1, wherein the second electrode is further configured as a sensor to detect contact of the user with the electronic stylus and in response cause the electronic stylus to enter an active mode.

4. An electronic stylus as described in claim 1, wherein the housing portion is shaped to be grasped by a hand of the user as a writing implement.

5. An electronic stylus as described in claim 1, wherein the second electrode comprises one or more conductive elements extending axially at least partially along the housing portion.

6. An electronic stylus as described in claim 1, wherein the second electrode comprises one or more conductive elements extending circumferentially at least partially around the housing portion.

7. An electronic stylus as described in claim 1, wherein the second communication channel formed via the second electrode provides additional bandwidth to transmit data to and receive data from the computing device relative to the first communication channel formed via the first electrode.

8. An electronic stylus as described in claim 1, wherein the second electrode is configured to form the second communication channel through a hand of the user when the user is holding the electronic stylus.

9. An electronic stylus as described in claim 1, further comprising circuitry to generate signals for operation of the first electrode and the second electrode, the signals detectable by the computing device to recognize the electronic stylus and resolve positions of the tip portion and a body of the user relative to the computing device.

10. An electronic stylus as described in claim 9, wherein the circuitry is configured to include a transmitter and a receiver for each of the first electrode and the second electrode.

11. An electronic stylus as described in claim 9, wherein different signals having different characteristics are generated by the circuitry for the first electrode and the second electrode to enable the computing device to distinguish between the different signals.

12. An electronic stylus for a computing device comprising:
    a housing portion and a tip portion shaped to form the electronic stylus;
    a first electrode arranged in the tip portion configured to form a first communication channel with the computing device through the tip portion; and
    a second electrode arranged in a grip area of the housing portion configured to form a second communication channel with the computing device through the grip area and through a body of a user when the user is in contact with the grip area, the second electrode further configured as a sensor to detect lack of contact with the user and in response cause the electronic stylus to enter a battery-conservation mode.

13. An apparatus comprising:
    a housing portion and a tip portion shaped to form an electronic stylus operable as an input device for providing input to a computing device; and
    an electrode arranged in a grip area of the housing portion configured to form a communication channel with the computing device through the grip area and through a hand of a user when the user is grasping the housing portion, the communication channel formed as a closed loop through the hand of the user when the hand is resting upon a digitizer panel of the computing device configured to recognize a position of the electronic stylus based at least in part upon signals communicated via the communication channel.

14. An apparatus as described in claim 13, wherein the communication channel enables sending of data to and receiving of data from the computing device.

15. An apparatus as described in claim 13, wherein the electrode is associated with one or more signal signatures for a signal communicated via the electrode, the signal signatures conveying information to the computing device used to resolve positions of the tip portion and the hand of the user relative to the computing device.

16. An apparatus as described in claim 13, further comprising at least one additional electrode arranged in the tip portion configured to form an additional communication channel with the computing device through the tip portion.

17. A system comprising:
    a computing device having a display device including a digitizer panel;
    an electronic stylus operable as an input device for providing input to the computing device via the digitizer panel, the electronic stylus including:
      a housing portion and a tip portion shaped to form the electronic stylus;
      a first electrode arranged in the tip portion configured to form a first communication channel with the computing device through the tip portion; and
      a second electrode arranged in a grip area of the housing portion configured to form a second communication channel with the computing device through the grip area and through a body of a user when the user is in contact with the grip area, a portion of the body of the user creating a closed loop for the second communication channel when in contact with or within a threshold distance from the computing device; and
    a stylus control module configured to recognize the electronic stylus and resolve positions of the tip portion and the body of the user relative to the computing device based on analysis of signal signatures derived from signals communicated by the electronic stylus via the first electrode and the second electrode.

18. A system as described in claim 17, wherein the stylus control module is implemented via a processing system of the computing device.

19. A system as described in claim 17, wherein the second electrode comprises one or more conductive elements extending axially at least partially along the housing portion.

20. A system as described in claim 17, wherein the second communication channel formed via the second electrode provides additional bandwidth to transmit data to and receive data from the computing device relative to the first communication channel formed via the first electrode.

* * * * *